3,701,590
METHOD OF IMPROVING COLOR DISCRIMINATION

Harry I. Zeltzer, Manchester by the Sea, Mass., assignor of a fractional part interest to Joseph Zallen, Boston, Mass.
No Drawing. Filed Nov. 8, 1971, Ser. No. 196,584
The portion of the term of the patent subsequent to June 22, 1988, has been disclaimed
Int. Cl. G02c 7/10, 7/04; G02b 1/04
U.S. Cl. 351—39
1 Claim

ABSTRACT OF THE DISCLOSURE

Color discrimination is improved in color blind persons by applying to one eye only a thin corneal contact lens transmitting light substantially only in the red zone and having light transmission in excess of approximately 40%.

---

This invention relates to a method and device for improving color discrimination. In particular it relates to the improvement in color discrimination in persons commonly referred to as "color blind."

In my U.S. Pat. No. 3,586,423, I described a method and device for improving color discrimination in which a corneal contact lens is applied to one eye only, the other eye being either naked or with the required refractive correction. The corneal contact lens of this patent was described as being thin, transmitting light substantially only in the red zone, having approximately 14 to 40% light transmission and having substantially no transmission below 590 millimicrons. In the clinical experiments that I conducted leading to the patent, I found that below about 14% light transmission binocular vision began to be affected. I also found that when transmission was higher than about 40% the color discrimination ability apparently began to decrease.

I have treated a number of color blind patients in accordance with my patent and found that nearly all reported substantial improvement in color discrimination. However, there was one myopic, color blind patient who reported that when he wore the single contact lens in accordance with the patent, the lens seemed too dark.

Accordingly, I decided to re-investigate the upper limit of approximately 40% transmission that my earlier experiments appeared to establish. Unexpectedly, I found that with single red contact lenses having transmissions of up to about 85%, color blind patients reported substantial improvement in color discrimination and the myopic patient could now use the lens under low light.

It now appears from further experiments that the approximate 40% transmission maximum was anomalous. I have now determined that applying to one eye only a thin corneal contact lens transmitting light substantially only in the red zone, having an amount of light transmission in excess of approximately 40%, and having substantially no transmission below approximately 590 millimicrons improves color discrimination in a person deficient in color discrimination. As in my patent, the other eye is left uncovered except for the optional use of a spectacle lens, conventional corneal contact lens, or a combination thereof to provide a desired refractive correction for that eye.

The corneal contact lens of this invention can be made from a variety of materials including polymethacrylate resins. In general, acuity should be at least 20/40 so that stereopsis is not lost. This invention should not be expected to improve color perception in persons who have amblyopia, strabismus or monocular vision. The lens of this invention appears to have the same usefulness as the lens in the prior patent in that it does not interfere with the person's mobility or performance of ordinary functions such as walking, driving, writing, reading or working. It appears to have some superiority in performing these functions under artificial light and marked superiority with respect to pastel colors as compared with the lens used in my patent.

SPECIFIC EXAMPLE OF INVENTION

In one example of this invention, a contact lens was used which was made of red polymethacrylate. The lens had a radius of 7.76 mm., a diameter of 9.3 mm. and a thickness of .11+ mm. It had peripheral bevels of 13.00 mm./.2 mm., 9.50 mm./.2 mm. and 8.50 mm./.2 mm., and an optic zone of 8.1 mm. The lens transmitted substantially only in the red zone with practically no transmission below about 590 millimicrons, and had light absorption of about 15–20%, or light transmission of about 80 to 85%.

I fitted the myopic patient with this single contact lens in one eye, namely his non-dominant eye, leaving the dominant eye covered with a clear spectacle lens having the required correction for his myopia. The patient's response was immediately very favorable. Whereas he had been unable to use the lens of my patent, he now found that he could wear the lens of the present invention with comfort. Further, he reported a very substantial increase not only in color discrimination but also in his general ability to discriminate visually and see objects more clearly. Further, the patient reported that he could distinguish between pastel colors and that he had normal depth and speed perception while driving an automobile. He passed all the plate identifications which comprise the Ishihara test.

Although I cannot explain this phenomenon with any certainty, it is my belief that what is taking place is a form of retinal rivalry wherein what is distorted with one eye is compensated by the other eye. This would explain why use of the red contact lens on the non-dominant eye appears to be more effective.

In fitting the lens, the procedures used are similar to those for fitting other contact lenses. The lens thickness and curvature may be altered to suit the patient who does have satisfactory visual acuity.

I claim:
1. A method for improving color discrimination in a person deficient in color discrimination comprising the method of applying to one eye only a thin corneal contact lens transmitting light substantially only in the red zone, having light transmission in excess of approximately 40%, and having substantially no light transmission below about 590 millimicrons; the other eye being left uncovered except for the optional use of a spectacle lens, conventional corneal contact lens, or a combination thereof to provide a desired refractive correction for that eye.

References Cited
UNITED STATES PATENTS
3,586,423    6/1971    Zeltzer _____ 351—39

DAVID SCHONBERG, Primary Examiner
J. W. LEONARD, Assistant Examiner

U.S. Cl. X.R.
351—41, 44, 162